United States Patent
Gupta et al.

(10) Patent No.: US 11,467,772 B2
(45) Date of Patent: Oct. 11, 2022

(54) PREEMPTIVE STAGING FOR FULL-STRIDE DESTAGE

(71) Applicant: International Business Machines Corporation, Armonk, NY (US)

(72) Inventors: Lokesh Mohan Gupta, Tucson, AZ (US); Clint A. Hardy, Tucson, AZ (US); Brian Anthony Rinaldi, Tucson, AZ (US); Karl Allen Nielsen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 16/855,229

(22) Filed: Apr. 22, 2020

(65) Prior Publication Data
US 2021/0334038 A1 Oct. 28, 2021

(51) Int. Cl.
*G06F 3/06* (2006.01)

(52) U.S. Cl.
CPC ............ *G06F 3/0659* (2013.01); *G06F 3/061* (2013.01); *G06F 3/067* (2013.01); *G06F 3/0653* (2013.01); *G06F 3/0689* (2013.01)

(58) Field of Classification Search
CPC .......... G06F 3/06–0689; G06F 3/0659; G06F 3/061; G06F 3/0653; G06F 3/067
See application file for complete search history.

(56) References Cited

U.S. PATENT DOCUMENTS

| 5,740,465 | A | * | 4/1998 | Matsunami | G06F 3/0659 710/24 |
|---|---|---|---|---|---|
| 8,661,203 | B2 | | 2/2014 | Benhase et al. | |
| 9,658,798 | B2 | | 5/2017 | Ash et al. | |
| 2002/0035666 | A1 | | 3/2002 | Beardsley et al. | |
| 2012/0079187 | A1 | * | 3/2012 | Beardsley | G06F 12/0804 711/113 |
| 2012/0265934 | A1 | | 10/2012 | Gupta et al. | |
| 2013/0024618 | A1 | * | 1/2013 | Doron | G06F 3/0643 711/114 |
| 2013/0024627 | A1 | * | 1/2013 | Benhase | G06F 12/0868 711/137 |
| 2013/0024628 | A1 | * | 1/2013 | Benhase | G06F 12/0891 711/144 |

(Continued)

OTHER PUBLICATIONS

IEE210165PCT, PCT International Search Report and Written Opinion, dated Jun. 24, 2021.

*Primary Examiner* — Nicholas J Simonetti
(74) *Attorney, Agent, or Firm* — Nelson IP; Daniel P. Nelson

(57) ABSTRACT

A method for improving destage performance to a RAID array is disclosed. In one embodiment, such a method periodically scans a cache for first strides that are ready to be destaged to a RAID array. While scanning the cache, the method identifies second strides that are not currently ready to be destaged to the RAID array, but will likely be ready to be destaged during a subsequent scan of the cache. The method initiates preemptive staging of any missing data of the second strides from the RAID array into the cache in preparation for the subsequent scan. Upon occurrence of the subsequent scan, the method destages, from the cache, the second strides from the cache to the RAID array. A corresponding system and computer program product are also disclosed.

20 Claims, 7 Drawing Sheets

(56) References Cited

U.S. PATENT DOCUMENTS

| | | | |
|---|---|---|---|
| 2014/0082303 A1* | 3/2014 | Ash | G06F 3/0685 |
| | | | 711/E12.001 |
| 2017/0054824 A1 | 2/2017 | Friedman et al. | |
| 2017/0177437 A1 | 6/2017 | Moertl et al. | |
| 2017/0351613 A1* | 12/2017 | Anderson | G06F 12/0868 |
| 2019/0187920 A1 | 6/2019 | Gupta et al. | |
| 2019/0294552 A1 | 9/2019 | Ash et al. | |

* cited by examiner

PREEMPTIVE STAGING FOR FULL-STRIDE DESTAGE

BACKGROUND

Field of the Invention

This invention relates to systems and methods for improving destage performance to RAID arrays.

Background of the Invention

A RAID (i.e., a Redundant Array of Independent Disks) is a storage technology that provides increased storage functions and reliability through redundancy. A RAID is created by combining multiple storage drive components (e.g., disk drives and/or solid state drives) into a logical unit. Data is then distributed across the drives using various techniques, referred to as "RAID levels." The standard RAID levels, which currently include RAID levels 1 through 6, are a basic set of RAID configurations that employ striping, mirroring, and/or parity to provide data redundancy. Each of the configurations provides a balance between two key goals: (1) increasing data reliability and (2) increasing I/O performance.

Disks configured in a RAID array may offer accelerated read performance since data may be accessed from multiple drives at the same time. However, there may be increased overhead when performing writes to RAID arrays such as RAID-5 or RAID-6 arrays. This is primarily due to the parity calculation. For example, in order to write to a subset (i.e., a strip) of a stride of data in a RAID-5 array, the other strips of the stride may need to be staged from the RAID-5 array in order to recompute the parity value associated with the stride. Once the parity value is recomputed, the entire stride may be destaged back to the RAID-5 array. Thus, less-than-full-stride writes to a RAID-5 array may require significant overhead to stage data from the RAID array, recalculate the parity value, and destage the data and recomputed parity value back to the RAID array. On the other hand, a write that makes up a full stride of data may be destaged to a RAID-5 array along with a computed parity value using a single operation. This is because there is no need to load any missing data values or parity value from the disk drives prior to writing a stride to the RAID array.

SUMMARY

The invention has been developed in response to the present state of the art and, in particular, in response to the problems and needs in the art that have not yet been fully solved by currently available systems and methods. Accordingly, the invention has been developed to improve destage performance to a RAID array. The features and advantages of the invention will become more fully apparent from the following description and appended claims, or may be learned by practice of the invention as set forth hereinafter.

Consistent with the foregoing, a method for improving destage performance to a RAID array is disclosed. In one embodiment, such a method periodically scans a cache for first strides that are ready to be destaged to a RAID array. While scanning the cache, the method identifies second strides that are not currently ready to be destaged to the RAID array, but will likely be ready to be destaged during a subsequent scan of the cache. The method initiates preemptive staging of any missing data of the second strides from the RAID array into the cache in preparation for the subsequent scan. Upon occurrence of the subsequent scan, the method destages, from the cache, the second strides from the cache to the RAID array.

A corresponding computer program product and system are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
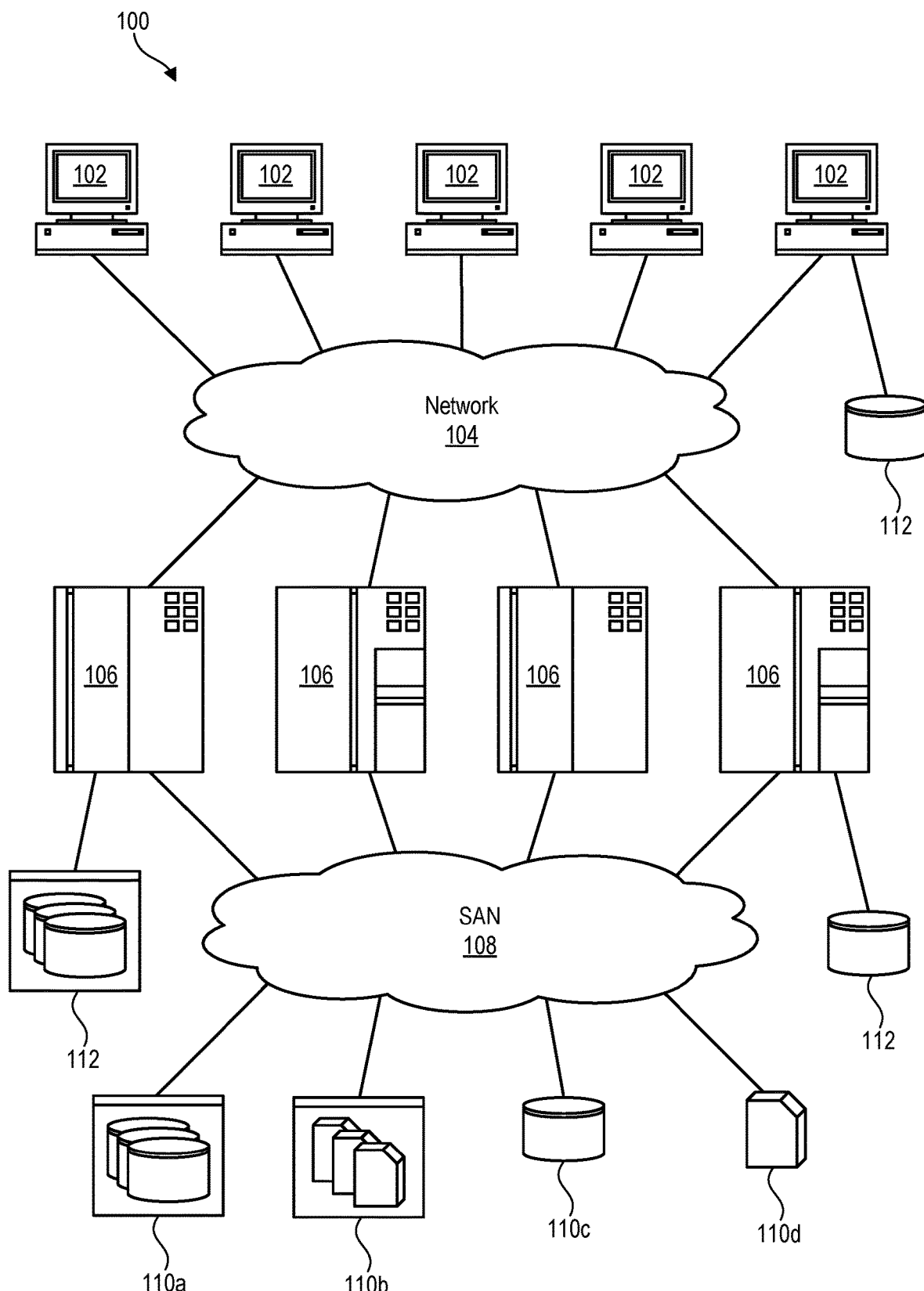
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where embodiments of the invention may operate. The network environment 100 is presented only by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
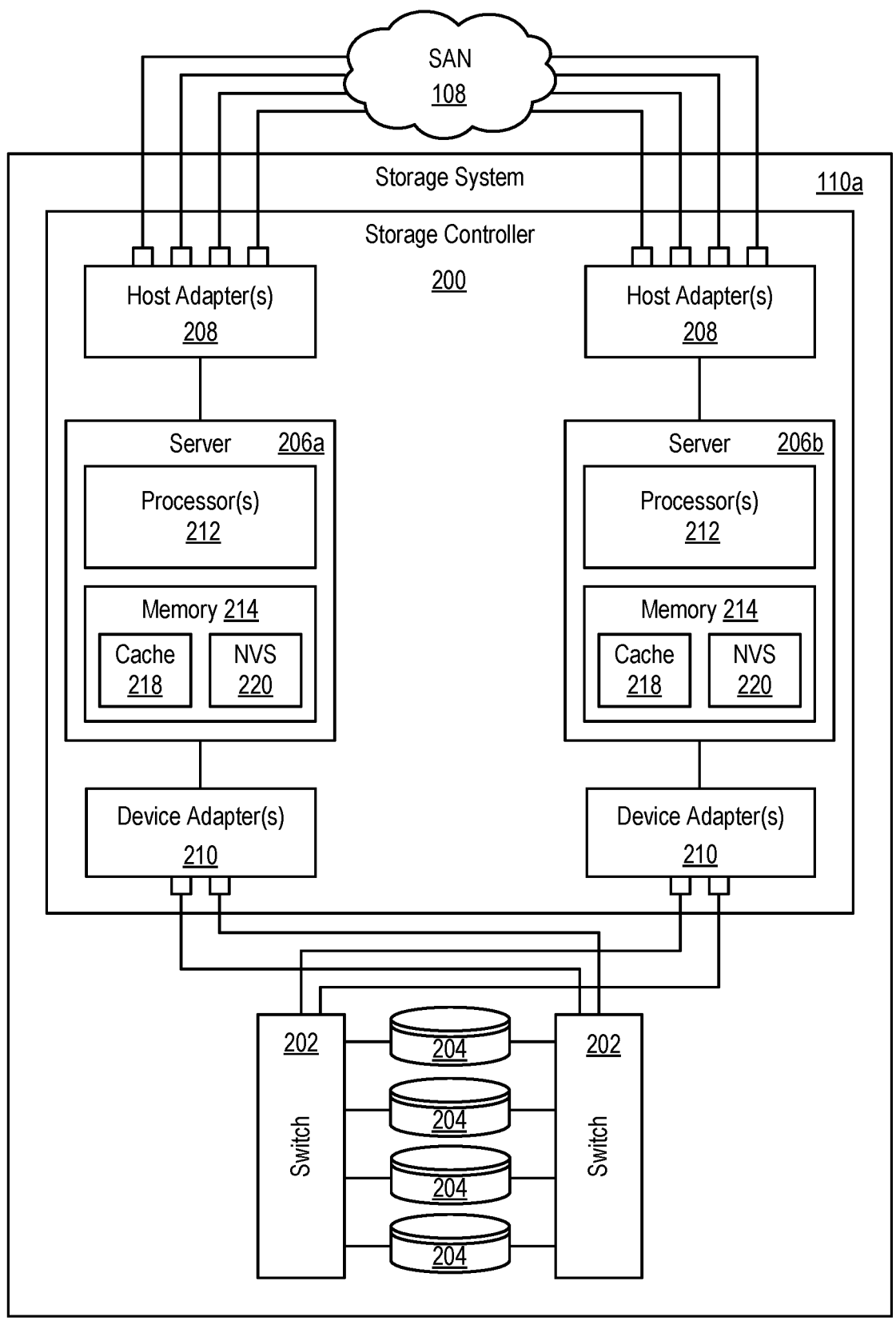
FIG. 2 is a high-level block diagram showing one example of a storage system for use in the network environment of FIG. 1.

Referring to FIG. 2, one embodiment of a storage system 110a containing an array of storage drives 204 (e.g., hard-disk drives and/or solid-state drives) is illustrated. As shown, the storage system 110a includes a storage controller 200, one or more switches 202, and one or more storage drives 204 such as hard disk drives and/or solid-state drives (such as flash-memory-based drives). The storage controller 200 may enable one or more hosts 106 (e.g., open system and/or mainframe servers 106) to access data in the one or more storage drives 204. The storage drives 204 may, in certain embodiments, be configured in RAID arrays of various RAID levels to provide desired levels of I/O performance and/or data redundancy.

In selected embodiments, the storage controller 200 includes one or more servers 206. The storage controller 200 may also include host adapters 208 and device adapters 210 to connect the storage controller 200 to host devices 106 and storage drives 204, respectively. During normal operation (when both servers 206 are operational), the servers 206 may manage I/O to different logical subsystems (LSSs) within the enterprise storage system 110a. For example, in certain configurations, a first server 206a may handle I/O to even LSSs, while a second server 206b may handle I/O to odd LSSs. These servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 includes one or more processors 212 and memory 214. The memory 214 may include volatile memory (e.g., RAM) as well as non-volatile memory (e.g., ROM, EPROM, EEPROM, flash memory, local disk drives, local solid state drives etc.). The volatile and non-volatile memory may, in certain embodiments, store software modules that run on the processor(s) 212 and are used to access data in the storage drives 204. These software modules may manage all read and write requests to logical volumes 302 in the storage drives 204.

In selected embodiments, the memory 214 includes a cache 218, such as a DRAM cache 218. Whenever a host 106 (e.g., an open system or mainframe server 106) performs a read operation, the server 206 that performs the read may fetch data from the storages drives 204 and save it in its cache 218 in the event it is required again. If the data is requested again by a host 106, the server 206 may fetch the data from the cache 218 instead of fetching it from the storage drives 204, saving both time and resources. Similarly, when a host 106 performs a write, the server 106 that receives the write request may store the write in its cache 218, and destage the write to the storage drives 204 at a later time. When a write is stored in a cache 218, the write may also be stored in non-volatile storage (NVS) 220 of the opposite server 206 so that the write can be recovered by the opposite server 206 in the event the first server 206 fails.

One example of a storage system 110a having an architecture similar to that illustrated in FIG. 2 is the IBM DS8000® enterprise storage system. The DS8000® is a high-performance, high-capacity storage controller providing disk and solid-state storage that is designed to support continuous operations. Nevertheless, the systems and methods disclosed herein are not limited to the IBM DS8000® enterprise storage system, but may be implemented in any comparable or analogous storage system or group of storage systems, regardless of the manufacturer, product name, or components or component names associated with the system. Any storage system that could benefit from one or more embodiments of the invention is deemed to fall within the scope of the invention. Thus, the IBM DS8000® is presented only by way of example and is not intended to be limiting.

Figures 3A, 3B:
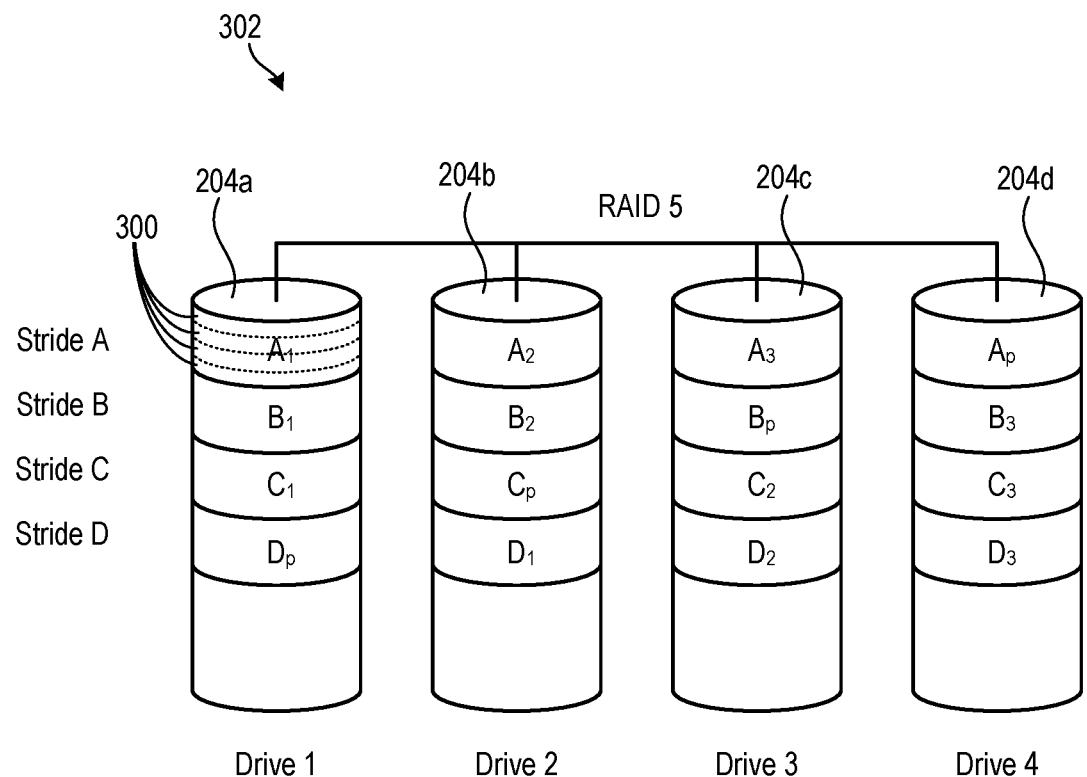
FIG. 3A is a high-level block diagram showing strides in a RAID array.
FIG. 3B is a table showing parity values calculated for each stride in the RAID array of FIG. 3A.

Referring to FIG. 3A, in selected embodiments, disk drives 204 of the storage system 110a may be configured in a RAID array 302 (i.e., a redundant array of inexpensive disks). For example, in a "RAID 5" array 302, logically sequential data may be segmented across multiple disk drives 204a-d. For example, where the disk drives 204a-d include four disks, logically sequential data "A" may be broken into segments "$A_1$", "$A_2$," and "$A_3$" (collectively referred to as "stride A") and stored on three separate disks 204a-c. In selected embodiments, each segment includes one or more tracks 300, although other divisions are also possible. Parity data "$A_p$" may be calculated by performing an XOR operation on $A_1$, $A_2$, and $A_3$. This parity data may be stored on a fourth disk 204d. Exemplary data and parity values are illustrated in FIG. 3B (the parity values are shaded). In the event one of the disks 204a-c fails, the remaining data and parity values may be used to reconstruct the data on the failed disk. For example, if the disk 204b containing $A_2$ is lost, the values $A_1$, $A_3$, and $A_p$ may be used to reconstruct $A_2$.

Disks configured in a RAID array 302 may offer accelerated read performance since data may be accessed from multiple drives 204a-c at the same time. However, there is typically increased overhead when performing writes to the array. This is primarily due to the parity calculation. For example, in order to write to $A_1$, the values $A_2$, $A_3$, and $A_p$ may need to be loaded (i.e., staged) from the disk drives 204, the value $A_1$ needs to be modified on the disk drives, and the parity value $A_p$ needs to be recomputed (using the values $A_1$, $A_2$, and $A_3$) and destaged to the disk drives 204. These operations require a total of four disk operations. On the other hand, a full stride of data (i.e., $A_1$, $A_2$, and $A_3$) may be destaged to the disk drives 204 along with the parity value $A_p$ using a single disk operation. This is because there is no need to load the data values or parity value from the disk drives 204 when writing a stride thereto. For this reason, full-stride destages are preferred when destaging data from the cache 218 to the storage drives 204.

Figure 4:
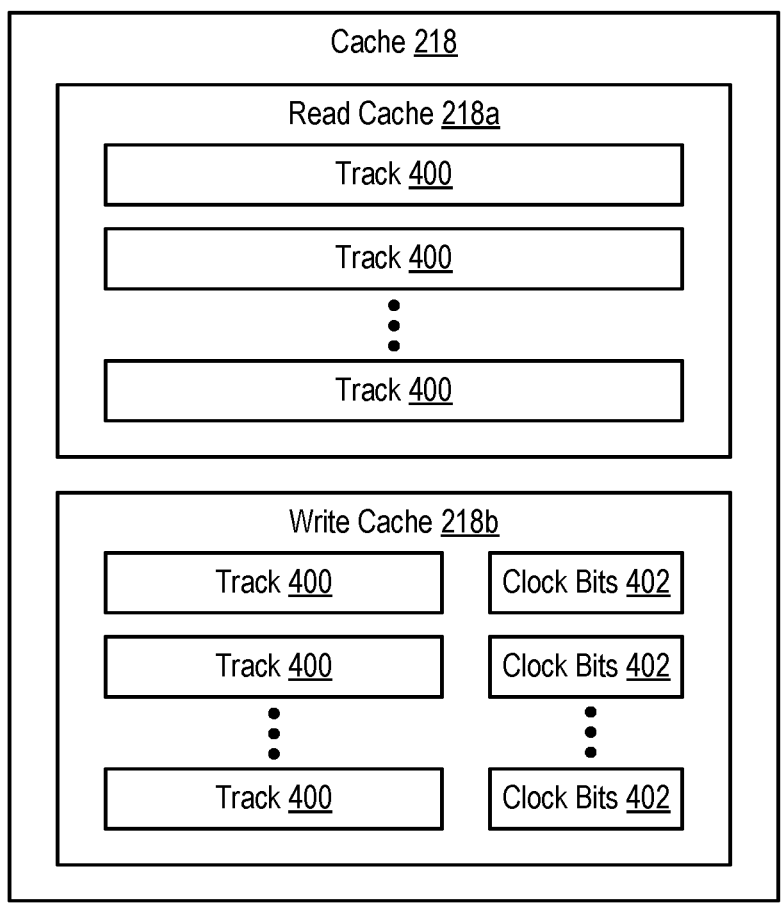
FIG. 4 is a high-level block diagram showing a read cache and write cache within the cache.

Referring to FIG. 4, in certain embodiments, the cache 218 may be divided into a read cache 218a and a write cache 218b. The read cache 218a may store unmodified data (e.g., unmodified tracks 400). The write cache 218b may store modified data (e.g., modified tracks 400). This modified data may eventually be destaged to backend storage drives 204.

In certain embodiments, an ordered list (e.g., a b-tree) of modified data elements (e.g., tracks) may be maintained for each rank (i.e., RAID array 302) in the storage system 110a. This ordered list may be used to determine which modified data elements to destage from the write cache 218b to the RAID array 302, as well as an order for performing the destages. In certain embodiments, the ordered list is sorted based on physical locations of each data element within the RAID array 302.

As shown in FIG. 4, in certain embodiments, one or more clock bits 402 may be maintained for each modified data element 400 in the write cache 218b. For example, in certain embodiments, four clock bits 402 may be maintained for each data element 400, enabling values of zero through fifteen. As will be explained in more detail in association with FIG. 6, these clock bits 402 may store counts that are used to determine when to destage the data elements. Each time the ordered list is scanned, the counts of the data elements may be decremented. Each time a data element 400 is written to, the count associated with the data element 400 may be incremented. The counts may ensure that data elements 400 that are written to often are not prematurely destaged from the cache 218 to the storage drives 204.

Figure 5:
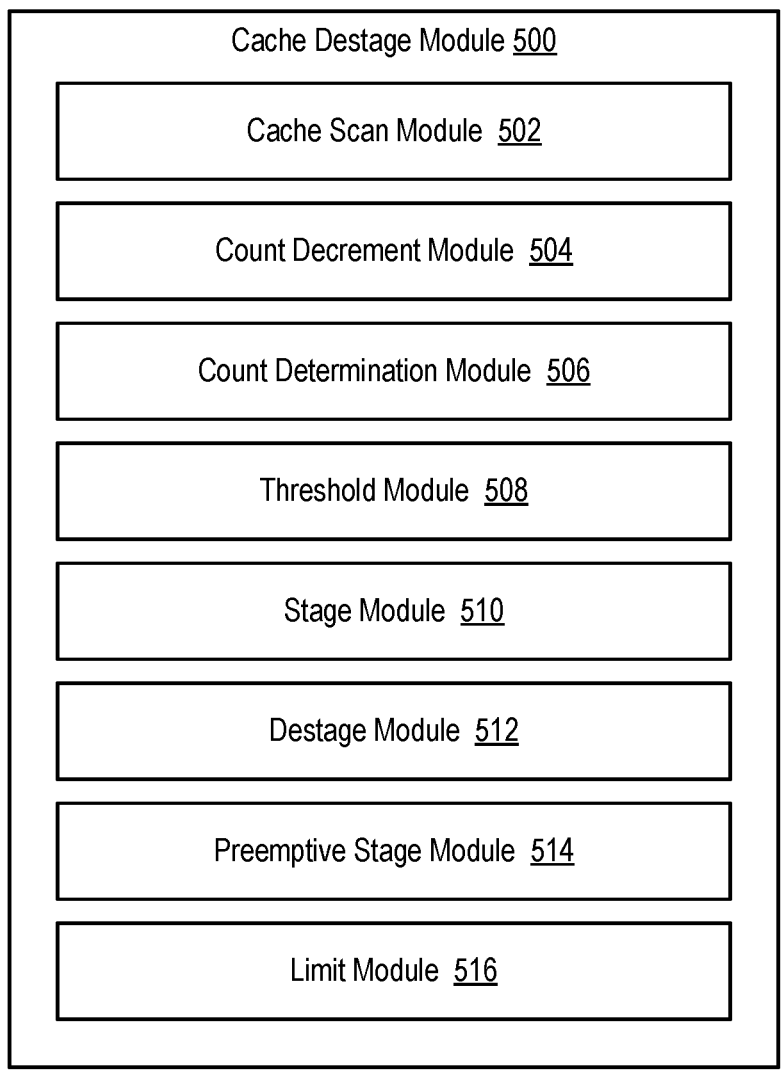
FIG. 5 is a high-level block diagram showing a cache destage module to destage data from the cache to a RAID array.

Referring to FIG. 5, in certain embodiments, a cache destage module 500 may be provided to destage data elements 400 from the write cache 218b to the storage drives 204. This cache destage module 500 may include various sub-modules to provide various features and functions. The cache destage module 500 and associated sub-modules may be implemented in hardware, software, firmware, or combinations thereof. The cache destage module 500 and associated sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

As shown, the cache destage module 500 includes one or more of a cache scan module 502, count decrement module 504, count determination module 506, threshold module 508, stage module 510, destage module 512, preemptive stage module 514, and limit module 516. The cache scan module 502 may be configured to periodically scan the ordered list to determine which data elements 400 are ready to be destaged from the write cache 218b to the RAID array 302. Each time data elements 400 in the ordered list are scanned, the count decrement module 504 may decrement the counts in the clock bits 402 associated with the data elements 400.

Upon scanning data elements 400 in the ordered list, the count determination module 506 may determine the counts associated with the data elements 400 by reading the clock bits 402. Upon making this determination, the threshold module 508, may determine whether all counts associated with data elements 400 from the same stride are less than or equal to a first threshold (e.g., zero). If the counts are less than or equal to the first threshold, the stage module 510 may, if needed, stage any missing data elements 400 from the RAID array 302 to the cache 218 so that the data elements 400 in the cache 218 make up a full stride. The destage module 512 may then, if necessary, recompute the parity value associated with the stride and destage the stride from the cache 218 to the RAID array 302.

If the counts for data elements 400 associated with the stride are not less than or equal to the first threshold, the threshold module 508 may determine if the counts are less than or equal to a second threshold (e.g., three). If so, the data elements 400 associated with the stride may not currently be ready for destage to the RAID array 302, but are likely to be ready during a subsequent scan of the cache 218. In such cases, the preemptive stage module 514 may preemptively stage any missing data elements 400 from the RAID array 302 to the cache 218 so that the full stride is present in the cache 218 for the next pass of the cache scan module 502. If, during the next scan of the cache 218, all counts associated with the data elements 400 of the stride are below the first threshold, the data elements 400 associated with the stride are ready for destage. Preemptively staging missing data elements 400 in this manner may eliminate or reduce the need to stage missing data elements 400 from the RAID array 302 to the cache 218 at the time of destage, thereby improving efficiency.

The limit module 516 may be configured to limit a number of strides that are in the process of being preemptively staged from a RAID array 302. In certain embodiments, the limit module 516 may limit the number of strides to a selected threshold (e.g., fifty). If the number of strides being preemptively staged equals or exceeds this amount, the limit module 516 may queue any additional requests for preemptive staging. When the number of strides being preemptively staged falls below the threshold (or an even lower threshold), the limit module 516 may once again begin processing requests to preemptively stage strides, starting with requests in the queue in the order they were placed in the queue. One embodiment of a method 700 that may be used by the limit module 516 will be discussed in association with FIG. 7.

Figure 6:
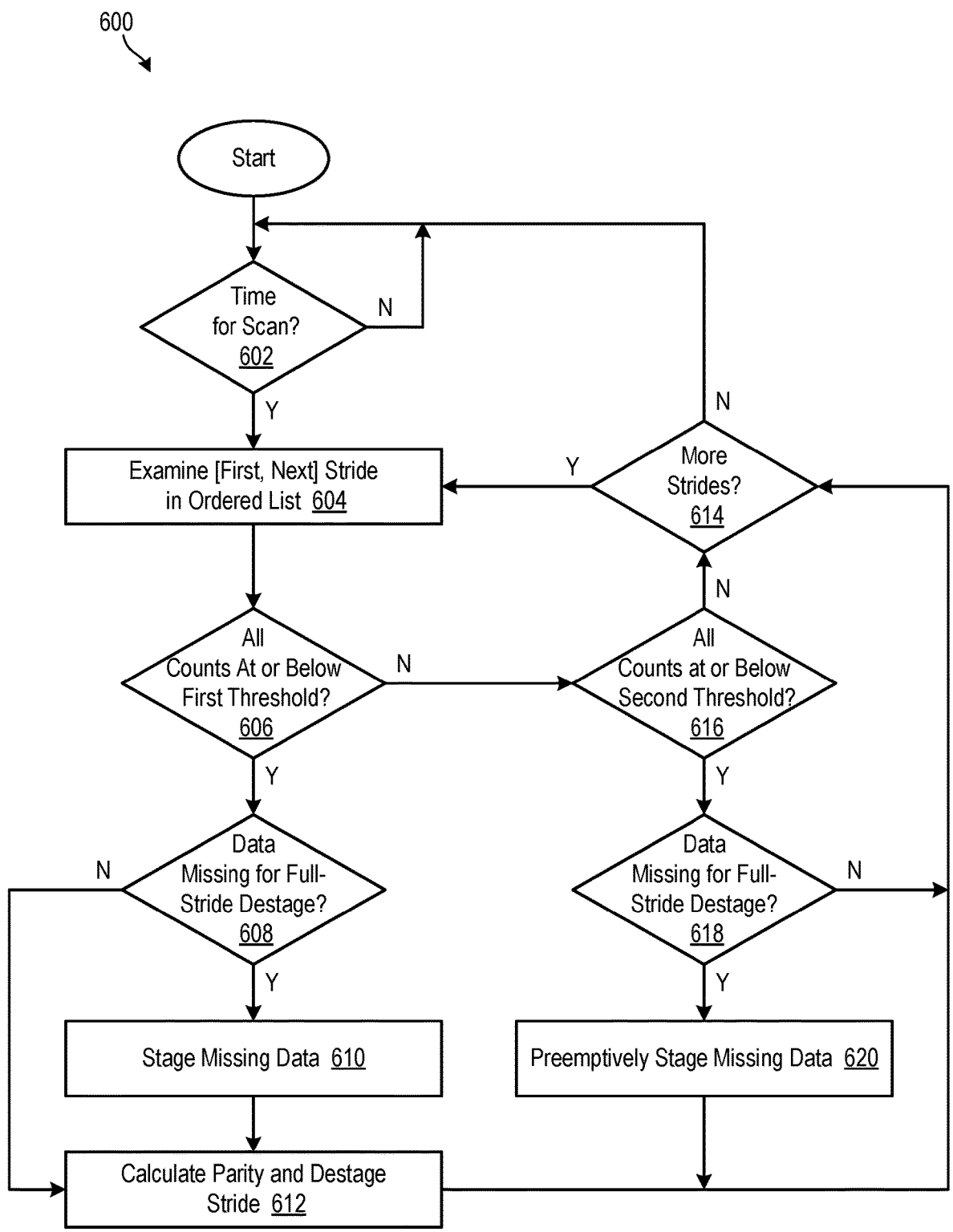
FIG. 6 is a flow diagram showing one embodiment of a method for scanning a cache for strides to destage to a RAID array.

Referring to FIG. 6, one embodiment of a method 600 for scanning a cache 218 is illustrated. Such a method 600 may be executed by the cache destage module 500 previously discussed. As shown, the method 600 initially determines 602 whether it is time to scan the cache 218. In certain embodiments, a scan may occur when a previous scan has completed or at a designated interval. The time needed to perform a scan may, in certain embodiments, correspond to an amount of time needed to proceed through the ordered list previously discussed.

As shown, when a new scan is initiated, the method 600 examines 604 data elements 400 in the cache 218 that are associated with a first stride in the ordered list. If, at step 606, counts (i.e., clock bits 402) of all data elements 400 associated with the stride are at or below a first threshold (e.g., zero), then the stride is ready for destage to the RAID array 302. If, at step 608, data is missing to perform a full-stride destage (assuming a full-stride destage is needed and/or the most efficient manner to destage the data), the method 600 stages 610 the missing data elements 400 from the RAID array 302 so that the full stride is present in the cache 218. Using the full stride of data, the method 600 recomputes 612 the parity value and destages 612 the stride to the RAID array 302. On the other hand, if, at step 608, data is not missing from the stride, the method 600 simply recomputes 612 the parity value and destages 612 the stride. No staging of missing data elements 400 from the RAID array 302 is needed. The method 600 then determines 614 whether the ordered list contains more strides and, if so, examines 604 the next stride in the ordered list.

If, at step 606, counts (i.e., clock bits 402) of all the data elements 400 associated with the stride are not at or below the first threshold, then the method 600 determines 616 whether counts of all of the data elements 400 associated with the stride are at or below a second threshold (e.g., three). If not, the method 600 determines 614 whether the ordered list contains more strides and, if so, examines 604 the next stride in the ordered list. If all of the data elements 400 associated with the stride are at or below the second threshold, the stride may not currently be ready for destage to the RAID array 302, but will likely be ready for destage during a subsequent scan of the cache 218 (assuming no further writes are made to the data elements 400). If, at step 616, all of the data elements 400 associated with the stride are at or below the second threshold, the method 600 determines 618 whether any missing data is needed to complete the stride, assuming a full-stride destage is needed and/or most efficient. If data is missing, the method 600 preemptively stages 620 the missing data from the RAID array 302 into the cache 218, thereby ensuring the full stride is present in the cache 218 for the next scan. On the other hand, if, at step 618, no data is missing from the stride, no preemptive staging is needed. The method 600 then determines 614 whether the ordered list contains more strides and, if so, examines 604 the next stride in the ordered list.

Once all strides in the ordered list have been examined 604, the method 600 ends and waits 602 for the next scan to begin. In certain embodiments, the next scan begins immediately. In other embodiments, the next scan begins after the previous scan has ended and a certain amount of time has passed. In yet other embodiments, scans occur at regular intervals and the next scan begins at the beginning of the next regular interval.

Figure 7:
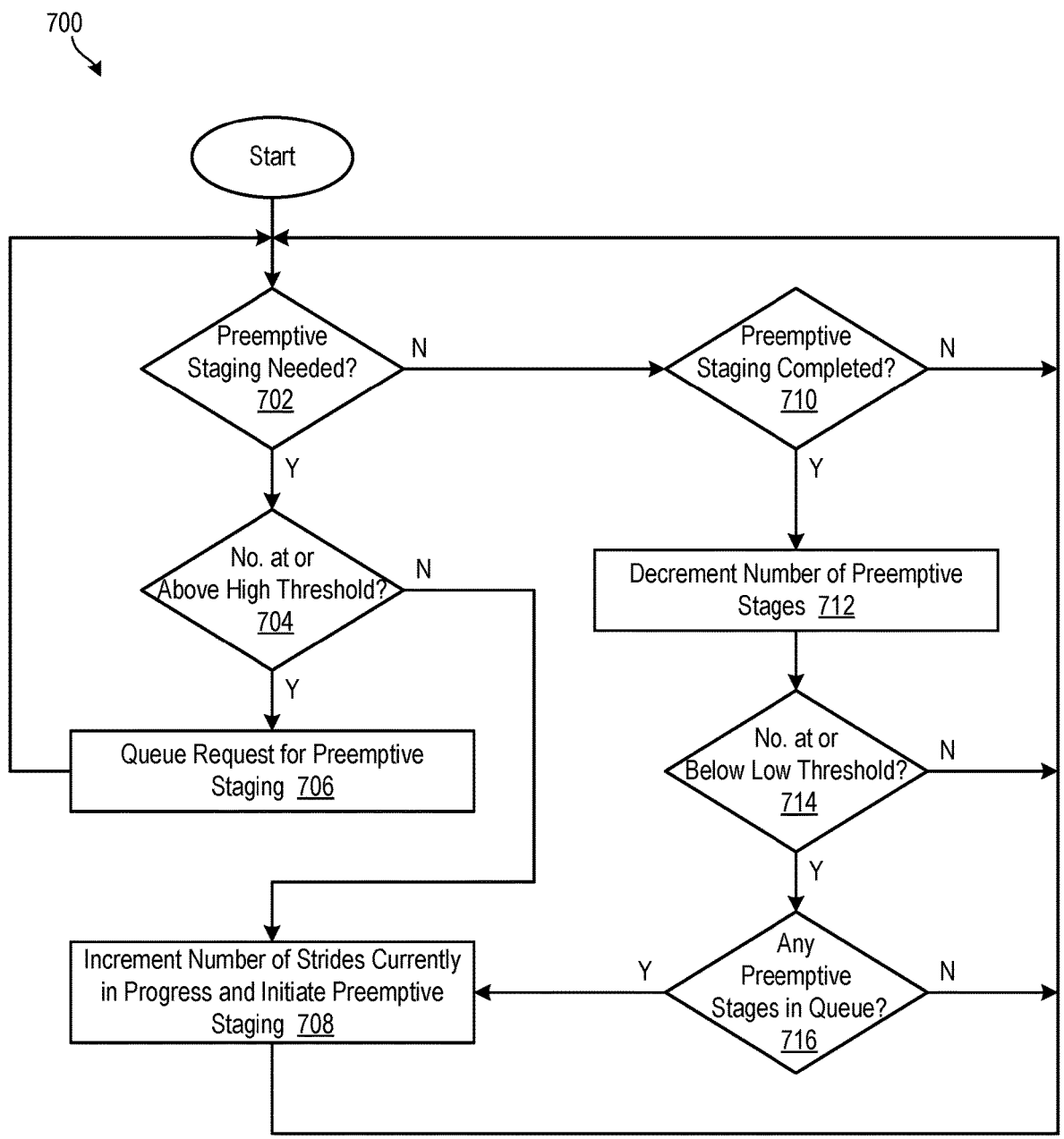
FIG. 7 is a flow diagram showing one embodiment of a method for regulating a number of strides that are preemptively staged to the cache.

Referring to FIG. 7, one embodiment of a method 700 for regulating a number of strides that are being preemptively staged from the RAID array 302 is illustrated. As shown, method 700 determines 702 whether preemptive staging is needed for a stride in the cache 218. If so, the method 700 determines 704 whether a number of strides being preemptively staged is above a high threshold (e.g., fifty). If so, the method 700 queues 706 the stride. If, at step 704, the number of strides being preemptively staged is below the high threshold, the method 700 increments 708 a number of strides that are currently being preemptively staged and initiates 708 preemptive staging for the stride.

If, at step 710, preemptive staging has completed for a stride, the method 700 decrements 712 a number of strides that are currently being preemptively staged. The method 700 then determines 714 whether the number of strides currently being preemptively staged is below a low threshold (e.g., forty). If so, the method 700 determines 716 whether any strides are currently in the queue. If so, the method 700 increments 708 the number of strides that are currently being preemptively staged and initiates 708 preemptive staging for the next stride up in the queue. If no strides are in the queue, the method 700 returns to the top to determine 702 whether another stride needs to be preemptively staged or determines 710 whether preemptive staging has been completed for a stride.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for improving destage performance to a RAID array, the method comprising:
   storing, within a RAID array, a plurality of strides, wherein each stride comprises a set of data elements distributed across multiple storage drives of the RAID array;
   maintaining a count for each data element of each stride of the plurality;
   periodically identifying first strides in the cache that are ready to be destaged to the RAID array, wherein identifying the first strides comprises identifying strides where each data element of the strides has a count less than or equal to a first designated threshold;
   while scanning the cache, identifying second strides of the plurality that are not currently ready to be destaged to the RAID array, but will likely be ready to be destaged during a subsequent scan of the cache, wherein identifying the second strides comprises identifying strides where each data element of the strides has a count less than or equal to a second designated threshold that is different than the first designated threshold;
   initiating, from the RAID array into the cache, preemptive staging of any missing data elements of the second strides needed to calculate parity values for the second strides; and
   destaging, from the cache, the second strides from the cache to the RAID array upon occurrence of the subsequent scan.

2. The method of claim 1, wherein each count is incremented each time its corresponding data element is written to.

3. The method of claim 2, wherein each count is decremented each time its corresponding data element is scanned.

4. The method of claim 1, wherein the first designated threshold is zero.

5. The method of claim 1, wherein each count includes four bits.

6. The method of claim 1, wherein the data elements are tracks.

7. The method of claim 1, wherein initiating preemptive staging comprises initiating preemptive staging for a number of second strides up to a designated threshold.

8. A computer program product for improving destage performance to a RAID array, the computer program product comprising a non-transitory computer-readable storage medium having computer-usable program code embodied therein, the computer-usable program code configured to perform the following when executed by at least one processor:
   store, within a RAID array, a plurality of strides, wherein each stride comprises a set of data elements distributed across multiple storage drives of the RAID array;
   maintain a count for each data element of each stride of the plurality;
   periodically identify first strides in the cache that are ready to be destaged to the RAID array, wherein identifying the first strides comprises identifying strides where each data element of the strides has a count less than or equal to a first designated threshold;
   while scanning the cache, identify second strides of the plurality that are not currently ready to be destaged to the RAID array, but will likely be ready to be destaged during a subsequent scan of the cache, wherein identifying the second strides comprises identifying strides where each data element of the strides has a count less than or equal to a second designated threshold that is different than the first designated threshold;
   initiate, from the RAID array into the cache, preemptive staging of any missing data elements of the second strides needed to calculate parity values for the second strides; and
   destage, from the cache, the second strides from the cache to the RAID array upon occurrence of the subsequent scan.

9. The computer program product of claim 8, wherein each count is incremented each time the data element is written to.

10. The computer program product of claim 8, wherein each count is decremented each time its corresponding data element is scanned.

11. The computer program product of claim 8, wherein the first designated threshold is zero.

12. The computer program product of claim 8, wherein each count includes four bits.

13. The computer program product of claim 8, wherein the data elements are tracks.

14. The computer program product of claim 8, wherein initiating preemptive staging comprises initiating preemptive staging for a number of second strides up to a designated threshold.

15. A system for improving destage performance to a RAID array, the system comprising:
- at least one processor;
- at least one memory device operably coupled to the at least one processor and storing instructions for execution on the at least one processor, the instructions causing the at least one processor to:
  - store, within a RAID array, a plurality of strides, wherein each stride comprises a set of data elements distributed across multiple storage drives of the RAID array;
  - maintain a count for each data element of each stride of the plurality;
  - periodically identify first strides in the cache that are ready to be destaged to the RAID array, wherein identifying the first strides comprises identifying strides where each data element of the strides has a count less than or equal to a first designated threshold;
  - while scanning the cache, identify second strides of the plurality that are not currently ready to be destaged to the RAID array, but will likely be ready to be destaged during a subsequent scan of the cache, wherein identifying the second strides comprises identifying strides where each data element of the strides has a count less than or equal to a second designated threshold that is different than the first designated threshold;
  - initiate, from the RAID array into the cache, preemptive staging of any missing data elements of the second strides needed to calculate parity values for the second strides; and
  - destage, from the cache, the second strides from the cache to the RAID array upon occurrence of the subsequent scan.

16. The system of claim 15, wherein each count is incremented each time the data element is written to and decremented each time the data element is scanned.

17. The system of claim 15, wherein each count is decremented each time its corresponding data element is scanned.

18. The system of claim 15, wherein the first designated threshold is zero.

19. The system of claim 15, wherein the data elements are tracks.

20. The system of claim 15, wherein initiating preemptive staging comprises initiating preemptive staging for a number of second strides up to a designated threshold.

* * * * *